United States Patent
Uçar et al.

(10) Patent No.: US 12,045,761 B2
(45) Date of Patent: Jul. 23, 2024

(54) SYSTEMS AND METHODS FOR DELIVERING ITEMS TO MOVING VEHICLES

(71) Applicant: Toyota Motor Engineering & Manufacturing North America, Inc., Plano, TX (US)

(72) Inventors: Seyhan Uçar, Mountain View, CA (US); Baik Hoh, Campbell, CA (US); Kentaro Oguchi, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 749 days.

(21) Appl. No.: 16/580,339

(22) Filed: Sep. 24, 2019

(65) Prior Publication Data

US 2021/0090018 A1    Mar. 25, 2021

(51) Int. Cl.
*G06Q 10/08*    (2024.01)
*B64C 39/02*    (2023.01)
(Continued)

(52) U.S. Cl.
CPC ....... *G06Q 10/0833* (2013.01); *B64C 39/024* (2013.01); *G01C 21/3438* (2013.01);
(Continued)

(58) Field of Classification Search
CPC ....... B64C 2201/208; B64C 2201/128; B64C 39/024; H04W 4/022; G08G 5/0069;
(Continued)

(56) References Cited

U.S. PATENT DOCUMENTS 9,494,937 B2 * 11/2016 Siegel .................. G05D 1/0027
9,659,502 B1    5/2017 Abebe et al.
(Continued)

FOREIGN PATENT DOCUMENTS

DE    102015005892 B3    9/2016
WO    2018065977 A1     4/2018
WO    2018169695 A1     9/2018

OTHER PUBLICATIONS

Ryan Randazzo, "Waymo's driverless cars on the road: Cautious, clunky, impressive," AZCentral.com, https://www.azcentral.com/story/money/business/tech/2018/12/05/phoenix-waymo-vans-how-self-driving-cars-operate-roads/2082664002/, Dec. 5, 2018 (Year: 2018).*

(Continued)

*Primary Examiner* — Resha Desai
*Assistant Examiner* — Michelle E Carey
(74) *Attorney, Agent, or Firm* — Dinsmore & Shohl LLP

(57) ABSTRACT

A controller for delivering an item is provided. The controller includes one or more processors, one or more memory modules, and machine readable instructions stored in the one or more memory modules. The controller is configured to determine a location or a traveling schedule of a first vehicle and a location of a second device, determine a zone where the first vehicle and the second device are expected to be proximate each other based on traffic information, the location or the traveling schedule of the first vehicle, and the location of the second device, instruct the first vehicle to move to the zone, and instruct the second device to transfer an item to the first vehicle in response to determining that the first vehicle and the second device are proximate each other at the zone.

18 Claims, 8 Drawing Sheets

(51) Int. Cl.
*G01C 21/34* (2006.01)
*G06Q 10/0832* (2023.01)
*G06Q 10/0833* (2023.01)
*G08G 1/095* (2006.01)
*G08G 5/00* (2006.01)
*H04W 4/021* (2018.01)
*B64U 80/86* (2023.01)
*B64U 101/60* (2023.01)

(52) U.S. Cl.
CPC ..... *G01C 21/3461* (2013.01); *G06Q 10/0832* (2013.01); *G08G 1/095* (2013.01); *G08G 5/0069* (2013.01); *H04W 4/022* (2013.01); *B64U 80/86* (2023.01); *B64U 2101/60* (2023.01)

(58) Field of Classification Search
CPC ............... G08G 1/095; G01C 21/3461; G01C 21/3438; G06Q 10/0832; G06Q 10/0833; G06Q 10/08
See application file for complete search history.

(56) References Cited

U.S. PATENT DOCUMENTS

| | | |
|---|---|---|
| 9,731,821 B2 | 8/2017 | Hoareau et al. |
| 9,981,745 B2 | 5/2018 | Gil |
| 10,467,579 B1* | 11/2019 | Reiss ................. G06Q 10/0833 |
| 2015/0242811 A1* | 8/2015 | Gillen ................ G06Q 10/0838 |
| | | 705/338 |
| 2015/0370251 A1 | 12/2015 | Siegel et al. |
| 2018/0082356 A1* | 3/2018 | Wilkinson ........... G06Q 10/083 |
| 2018/0137454 A1 | 5/2018 | Kulkarni et al. |
| 2019/0043001 A1 | 2/2019 | Woulfe et al. |
| 2019/0043370 A1* | 2/2019 | Mulhall ............... G08G 5/0026 |
| 2020/0286034 A1* | 9/2020 | Ur ...................... G01C 21/3423 |
| 2020/0349511 A1* | 11/2020 | Seaver ............ G06Q 10/06315 |
| 2021/0166192 A1* | 6/2021 | Balva ..................... G06Q 50/30 |

OTHER PUBLICATIONS

Amy Frearson, "BMW Concept Car Could Receive Drone Deliveries On The Move", Jan. 6, 2017, URL: https://www.dezeen.com/2017/01/06/bmw-5-series-sedan-concept-car-ces-consumerelectronics-show-2017-drone-deliveries/.

Ghazzai, et al., "On the Placement of UAV Docking Stations for Future Intelligent Transportation Systems", IEEE Vehicular Technology Conference (VTC Spring), 2017.

* cited by examiner

SYSTEMS AND METHODS FOR DELIVERING ITEMS TO MOVING VEHICLES

TECHNICAL FIELD

The present specification generally relates to systems and methods for delivering an item to a moving vehicle and, more specifically, to systems and methods for delivering an item to a moving vehicle by determining a zone where the moving vehicle and a device including the item are expected to be proximate to each other.

BACKGROUND

Items may need to be transferred from a device (e.g., a vehicle or a container) to a vehicle, such as when a customer orders an item and would like to have the item placed in her vehicle from a delivery vehicle or a delivery container.

Accordingly, a need exists for systems for delivering an item to a vehicle.

SUMMARY

In one embodiment, a controller for delivering an item is provided. The controller includes one or more processors, one or more memory modules, and machine readable instructions stored in the one or more memory modules. The controller is configured to determine a location or a traveling schedule of a first vehicle and a location of a second device, determine a zone where the first vehicle and the second device are expected to be proximate each other based on traffic information, the location or the traveling schedule of the first vehicle, and the location of the second device, instruct the first vehicle to move to the zone, and instruct the second device to transfer an item to the first vehicle in response to determining that the first vehicle and the second device are proximate each other at the zone.

In another embodiment, a method for delivering an item is provided. The method includes determining a location or a traveling schedule of a first vehicle and a location of a second device, determining a zone where the first vehicle and the second device are expected to be proximate each other based on traffic information, the location or the traveling schedule of the first vehicle, and the location of the second device, instructing the first vehicle to move to the zone, and instructing the second device to transfer an item to the first vehicle in response to determining that the first vehicle and the second device are proximate each other at the zone.

In yet another embodiment, a system includes a first vehicle, a second device, and a server communicatively coupled to the first vehicle and the second device. The server is configured to determine a zone where the first vehicle and the second device are expected to be proximate each other based on traffic information, a location or a traveling schedule of the first vehicle, and a location of the second device, instruct the first vehicle to move to the zone, and instruct the second device to transfer an item to the first vehicle in response to determining that the first vehicle and the second device are proximate each other at the zone.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1A:
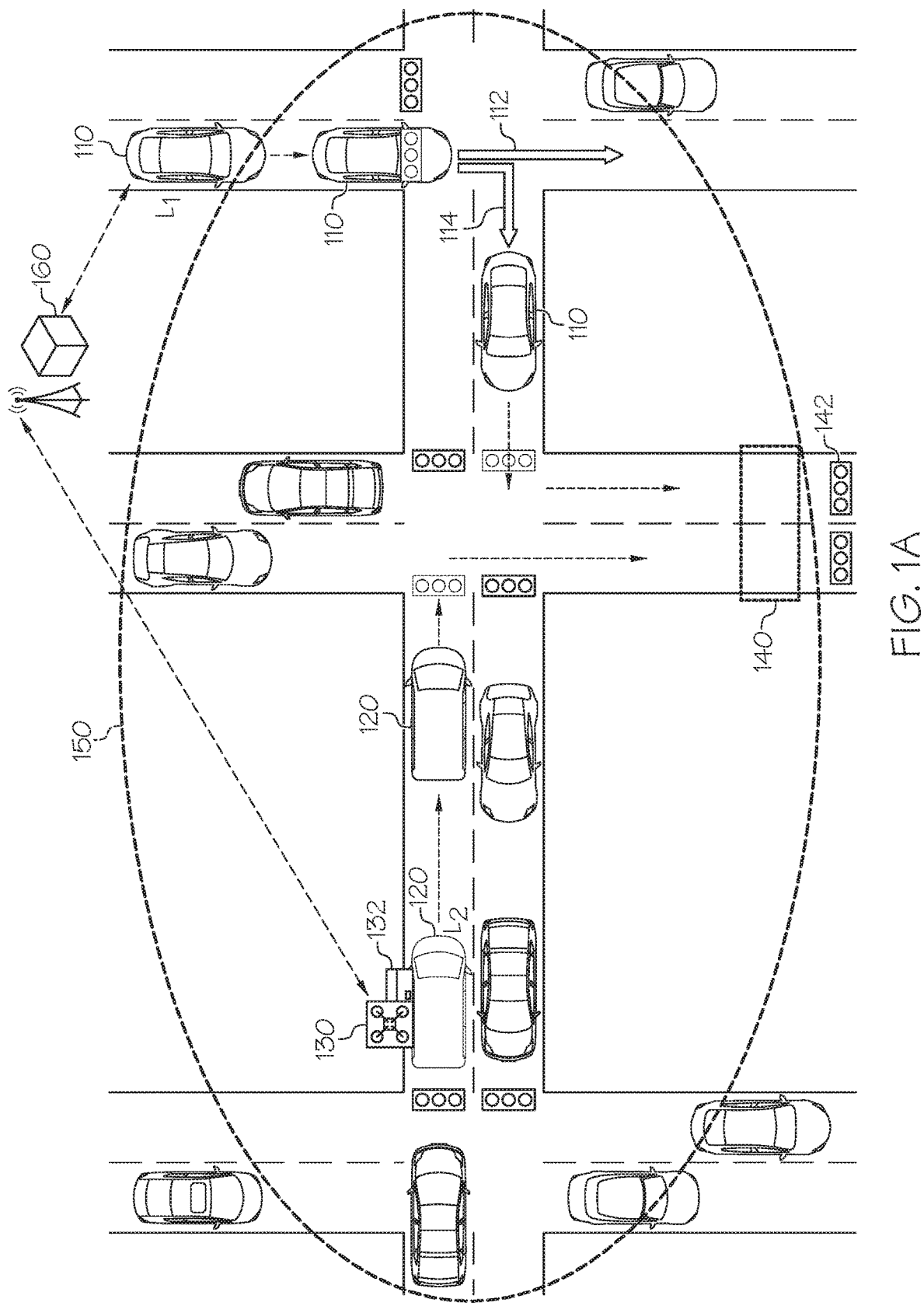
FIG. 1A depicts a system for delivering an item to a moving vehicle, according to one or more embodiments shown and described herein.
Figure 3:
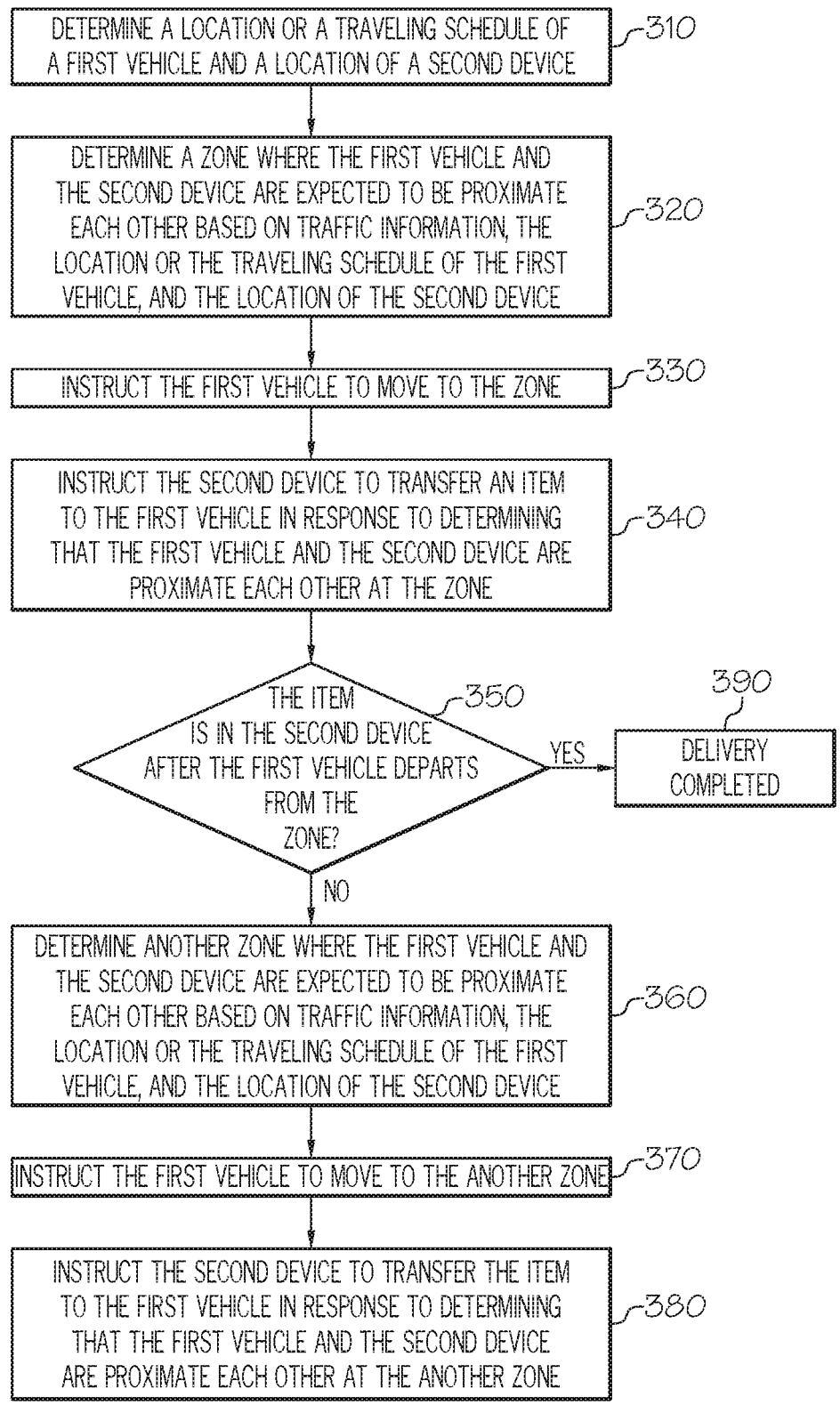
FIG. 3 is a flowchart for delivering an item to a moving vehicle, according to one or more embodiments shown and described herein.

The embodiments disclosed herein include systems and methods for delivering an item to a moving vehicle using another vehicle, such as an unmanned aerial vehicle. Referring generally to FIGS. 1A and 3, a method for delivering an item to a vehicle using another vehicle, such as an unmanned aerial vehicle is provided. A system determines a location or a traveling schedule of a first vehicle 110 and a location of a second device (e.g., a second vehicle 120 or a stationary container 710 in FIG. 7). The system determines a zone where the first vehicle 110 and the second device are expected to be proximate each other based on traffic information, the location or the traveling schedule of the first vehicle, and the location of the second device. For example, the system determines that the first vehicle 110 and the second vehicle are expected to be proximate each other at a zone 140. The system instructs the first vehicle 110 to move to the zone 140 and instructs the second vehicle 120 to transfer an item to the first vehicle 110 in response to determining that the first vehicle 110 and the second vehicle 120 are proximate each other at the zone.

The systems and methods according to the present disclosure provide the secure, convenient, and customized delivery of an item to a trusted entity. Specifically, the system of the present disclosure helps a customer to order an item online and pick up the item at a preferred time while commuting on a road. Whenever a customer orders an item, the customer may select a delivery location, a range, and an estimated pick-up time based on her scheduling, e.g., commuting schedule. Based on customer preferences, the estimated location range and pick-up time are selected, and the system organizes delivering an item based on the estimated location range and pick-up time without violation of customer schedule and/or plan. Additionally, according to the present disclosure, an unmanned aerial vehicle may be operated to fly for a short time or distance and within line of sight view of a human operator, which may be compatible with FAA regulations.

FIG. 1A depicts a system for delivering an item to a moving vehicle, according to one or more embodiments shown and described herein. In embodiments, the system 100 includes a first vehicle 110, a second vehicle 120, and a server 160. The details of the first vehicle 110, the second vehicle 120, and the server 160 will be described below with reference to FIG. 2.

The first vehicle 110 and the second vehicle 120 may be an automobile or any other passenger or non-passenger vehicle such as, for example, a terrestrial, aquatic, and/or airborne vehicle including, but not limited, a bus, a train, a scooter, and a bicycle. In some embodiments, the vehicle 110 and the second vehicle 120 may be an autonomous vehicle that navigates its environment with limited human input or without human input. Each of the first vehicle 110 and the second vehicle 120 may transmit its current location and/or a planned route to the server 160. The server 160 may be a remote server or an edge server such as a road side unit.

In embodiments, the second vehicle 120 may carry an unmanned aerial vehicle 130. For example, the unmanned aerial vehicle 130 may be carried in a container of the second vehicle 120, such as a trunk. As another example, the unmanned aerial vehicle 130 may dock onto the top of the second vehicle 120. In some embodiments, the unmanned aerial vehicle 130 may independently follow the second vehicle 120.

In embodiments, a user may order an item (e.g., by placing an online order) and set a pick-up region and/or time based on her schedule and/or a commute plan. For example, as shown in FIG. 1A, a pick-up region 150 may be set by the user. The pick-up time may be set at 6:00 pm. As another example, the pick-up time may be set as a range, e.g., between 6:30 pm and 6:40 pm. In response to the order by the user, the server 160 may instruct the second vehicle 120 to carry the item 132 to the pick-up region 150 according to the pick-up time. In embodiments, the first vehicle 110 may be related to the user ordering the item. For example, the user may be the driver or passenger of the first vehicle 110. As another example, the first vehicle 110 may be the vehicle of a person designated by the user ordering the item (e.g., a spouse, family, relative, and the like) to pick up the item.

The server 160 may determine a zone where the first vehicle 110 and the second vehicle 120 are expected to be proximate each other based on traffic information, the location or the traveling schedule of the first vehicle 110, and/or the location of the second vehicle 120. The zone may include at least one of a parking lot, a rest area, an intersection, a short-term pull over area, and a low speed limit zone where the first vehicle 110 and the second vehicle 120 are expected to be proximate each other. By referring to FIG. 1A, the server 160 may determine that the first vehicle 110 and the second vehicle 120 are expected to proximate each other at a zone 140 based on traffic information, the location or the traveling schedule of the first vehicle 110, and/or the location of the second vehicle 120. For example, the first vehicle 110 may be at location L1 and the second vehicle 120 may be at location L2. The server 160 may determine that both the first vehicle 110 and the second vehicle 120 may arrive at the zone 140 approximately at the same time by taking into consideration various factors including the speeds of the first vehicle 110 and the second vehicle 120, traffic flow on roads within the pick-up region 150, traffic light information, and the like. Additionally, the server 160 may determine that both the first vehicle 110 and the second vehicle 120 may stop or move less than a threshold speed (e.g., 5 miles per hour, 10 miles per hour, etc.) at the zone 140 due to the light of a traffic light 142 being red or traffic congestion near the zone 140.

In some embodiments, the server 160 may provide information about expected delivery time and suggest a departure time of the first vehicle 110 to the first vehicle 110. For example, the first vehicle 110 may commute between home and office. The server 160 may send to the device of the driver or passenger of the first vehicle 110 a message, e.g., "If you leave work at 6:30 pm, you will receive the item you ordered at 7:10 at zone A." In this regard, the driver or the passenger of the first vehicle 110 may re-schedule his or her plan according to the suggestion from the server 160.

Once the server 160 determines the zone 140, the server 160 may transmit routing instructions to the first vehicle 110 and the second vehicle 120. In embodiments, the server 160 may instruct the first vehicle 110 to reroute in order to arrive at the zone 140. For example, the original route of the first vehicle 110 may be a route following a directional arrow 112. The server 160 may instruct the first vehicle 110 to change the original route to a route that following a directional arrow 114 such that the first vehicle 110 may arrive at the zone 140 at the same time as the second vehicle 120 due to, e.g., the traffic light 142. In embodiments, when the first vehicle 110 and the second vehicle 120 are proximate each other at the zone 140, the second vehicle 120 may initiate transferring the item 132 from the second vehicle 120 to the first vehicle 110.

Figure 1B:
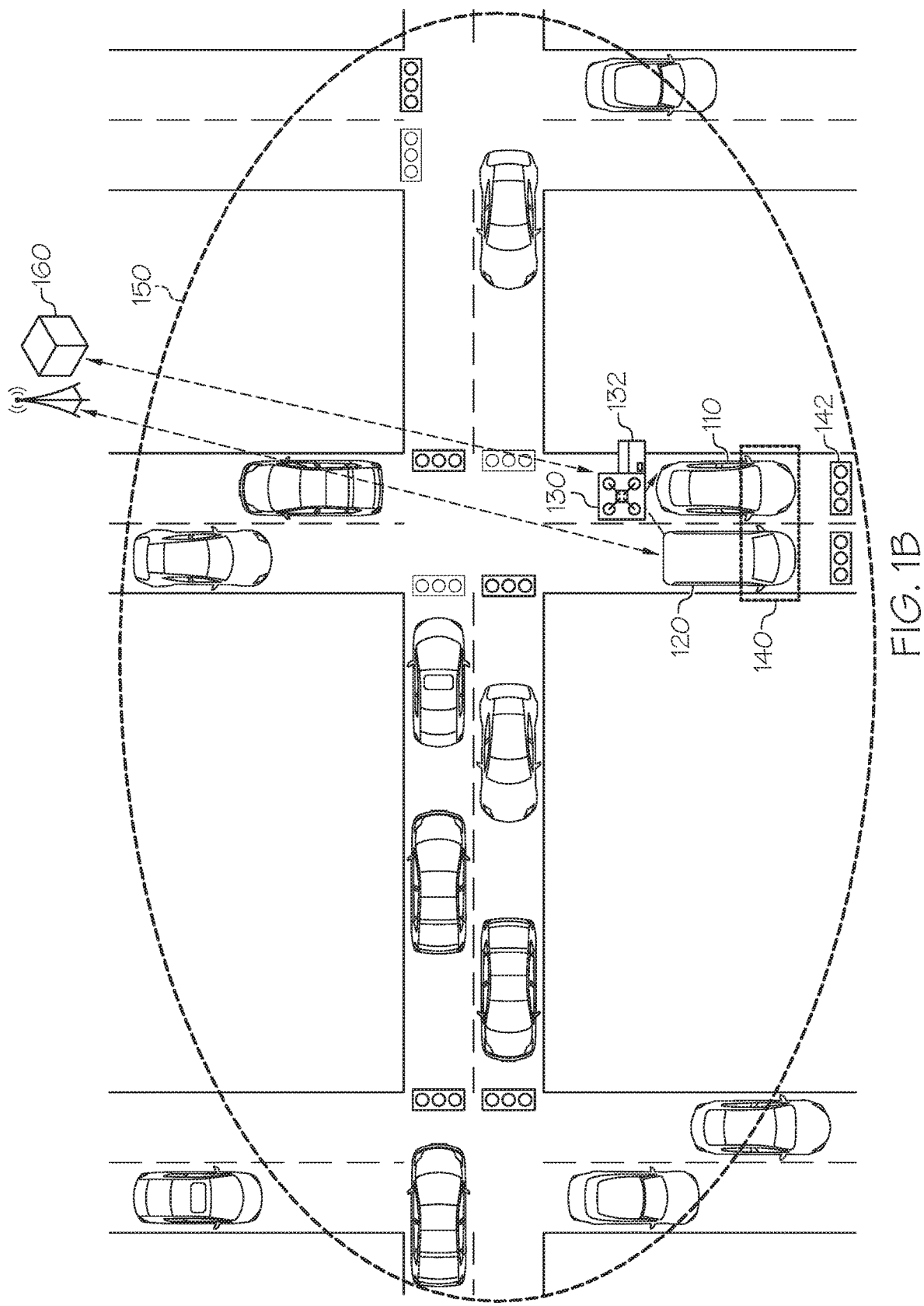
FIG. 1B depicts transferring the item from a second vehicle to a first vehicle, according to one or more embodiments shown and described herein.

FIG. 1B depicts transferring an item from the second vehicle 120 to the first vehicle 110, according to one or more embodiments shown and described herein. As shown in FIG. 1B, the first vehicle 110 and the second vehicle 120 are at the zone 140 and stop or move less than a threshold speed due to, for example, the red light of the traffic light 142 or traffic congestion. In embodiments, the server 160 may instruct the second vehicle 120 and/or the unmanned aerial vehicle 130 to transfer the item 132 to the first vehicle 110 when it is determined that the first vehicle 110 and the second vehicle 120 are proximate each other at the zone 140. The server 160 may determine whether the first vehicle 110 is an intended recipient of the item 132 and authenticate the first vehicle 110 before instructing the second vehicle 120 to transfer the item 132 based on identification information about the first vehicle 110 (e.g., a VIN number, a color and model of a vehicle, and the like). In some embodiments, the second vehicle 120 or the unmanned aerial vehicle 130 may authenticate the first vehicle 110 based on identification information about the first vehicle 110 received from the server 160.

In response to the instruction from the server 160, the second vehicle 120 may initiate transferring the item 132 to the first vehicle 110. For example, the second vehicle 120 may open a trunk or a sunroof of the second vehicle 120 and allow the unmanned aerial vehicle 130 to transfer the item 132 from the second vehicle 120 to the first vehicle 110. Because the unmanned aerial vehicle 130 files a relatively short distance for the delivery of an item, the present disclosure addresses conventional problems of deliveries by unmanned aerial vehicle such as insufficient flying range due to limited batteries, and limited flying due to Federal Aviation Administration regulations (e.g., restricted zones, line-of-sight of human operator restrictions, see-and-avoid requirements, etc.)

In some embodiment, the second vehicle 120 may include a robot arm that may be extended outside of the second vehicle 120. The robot arm may grab the item 132 and extend the item 132 toward the first vehicle 110 such that the driver or the passenger of the first vehicle 110 may receive the item 132.

While FIG. 1B depicts transferring an item from the second vehicle 120 to the first vehicle 110 on a road, items can be transferred at different locations. For example, the first vehicle 110 may park at a short term parking spot (e.g., parking lot, meter parking, at the like), and the second vehicle 120 may come to the parking location of the first vehicle 110 and transfer the item using the unmanned aerial vehicle.

Figure 2:
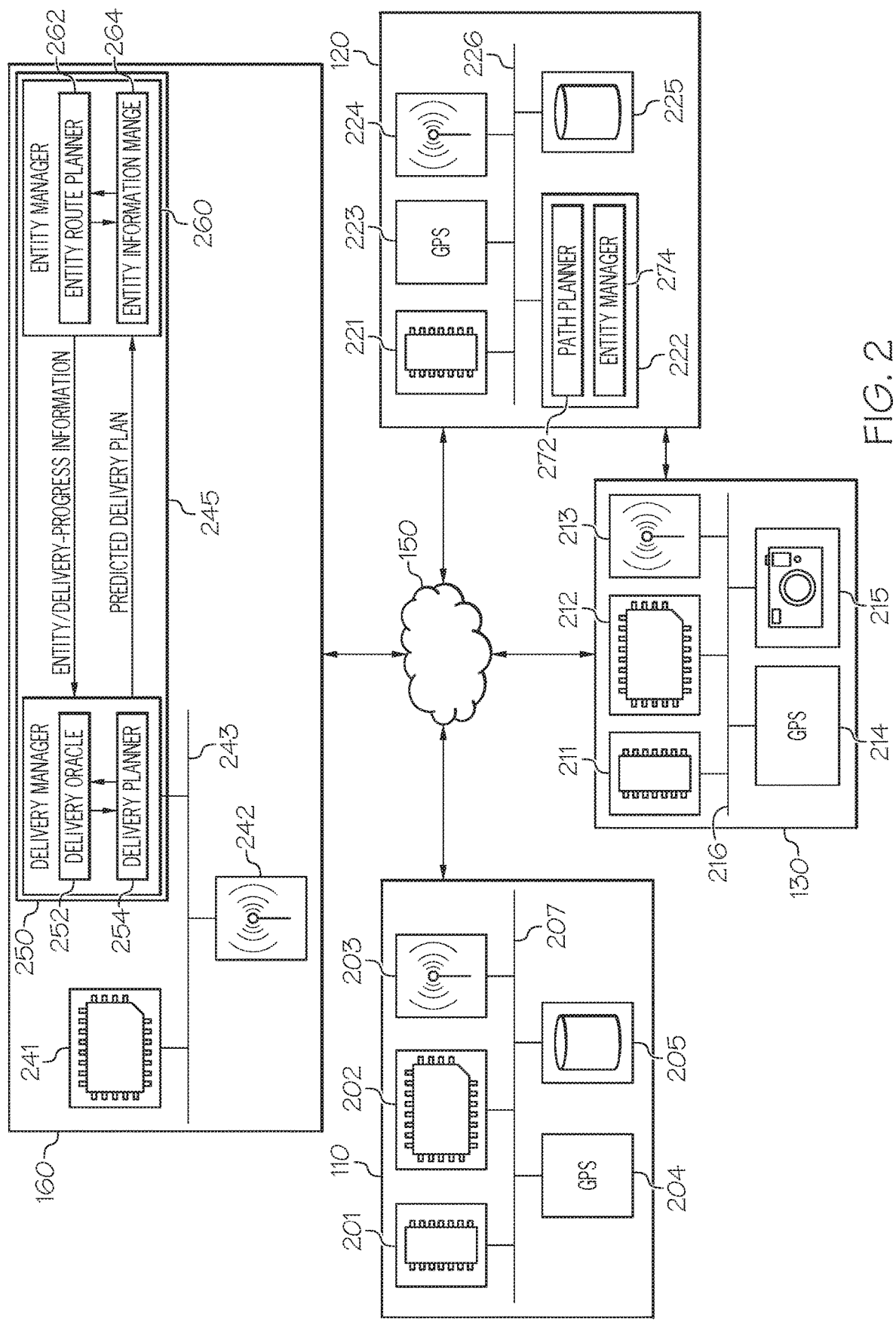
FIG. 2 depicts schematic diagrams of the system for delivering an item, according to one or more embodiments shown and described herein.

FIG. 2 depicts schematic diagrams of the system for delivering an item, according to one or more embodiments shown and described herein.

The first vehicle 110 includes one or more processors 201, one or more memory modules 202, a network interface hardware 203, a satellite antenna 204, and one or more vehicle sensors 205.

Each of the one or more processors 201 of the first vehicle 110 may be any device capable of executing machine readable instructions. Accordingly, each of the one or more processors 201 may be a controller, an integrated circuit, a microchip, a computer, or any other computing device. Each of the one or more processors 201 is communicatively coupled to the other components of the first vehicle 110 by a communication path 207. Accordingly, the communication path 207 may communicatively couple any number of processors with one another, and allow the components coupled to the communication path 207 to operate in a distributed computing environment. Specifically, each of the components may operate as a node that may send and/or receive data.

Each of the one or more memory modules 202 of the first vehicle 110 is coupled to the communication path 207 and communicatively coupled to the one or more processors 201. Each of the one or more memory modules 202 may comprise RAM, ROM, flash memories, hard drives, or any device capable of storing machine readable instructions such that the machine readable instructions can be accessed and executed by the one or more processors 201. The machine readable instructions may comprise logic or algorithm(s) written in any programming language of any generation (e.g., 1GL, 2GL, 3GL, 4GL, or 5GL) such as, for example, machine language that may be directly executed by the one or more processors 201, or assembly language, object-oriented programming (OOP), scripting languages, microcode, etc., that may be compiled or assembled into machine readable instructions and stored in the one or more memory modules 202. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. The one or more memory modules 202 may include driving history of the first vehicle 110 including, for example, previous routes, destinations, and the like.

Still referring to FIG. 2, the network interface hardware 203 is coupled to the communication path 207 and communicatively coupled to the one or more processors 201. The network interface hardware 203 may be any device capable of transmitting and/or receiving data via a network. Accordingly, the network interface hardware 203 can include a communication transceiver for sending and/or receiving any wired or wireless communication. For example, the network interface hardware 203 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 203 includes hardware configured to operate in accordance with the Bluetooth wireless communication protocol. In other embodiments, the network interface hardware 203 includes hardware configured to operate in accordance with a wireless communication protocol other than Bluetooth. The network interface hardware 203 of the first vehicle 110 may communicate with the server 160, the second vehicle 120, or the unmanned aerial vehicle 130.

Still referring to FIG. 2, a satellite antenna 204 is coupled to the communication path 207 such that the communication path 207 communicatively couples the satellite antenna 204 to other modules of the first vehicle 110. The satellite antenna 204 is configured to receive signals from global positioning system satellites. Specifically, in one embodiment, the satellite antenna 204 includes one or more conductive elements that interact with electromagnetic signals transmitted by global positioning system satellites. The received signal is transformed into a data signal indicative of the location (e.g., latitude, longitude, and altitude) of the satellite antenna 204 or an object positioned near the satellite antenna 204, by the one or more processors 201. The one or more memory modules 202 may include instructions for transmitting the location received by the satellite antenna 204 to the server 160.

The first vehicle 110 comprises one or more vehicle sensors 205. Each of the one or more vehicle sensors 205 is coupled to the communication path 207 and communicatively coupled to the one or more processors 201. The one or more vehicle sensors 205 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

The unmanned aerial vehicle 130 includes one or more processors 211, one or more memory modules 212, a network interface hardware 213, a satellite antenna 214, and one or more cameras 215. Each of the one or more processors 211 of the unmanned aerial vehicle 130 may be any device capable of executing machine readable instructions. Accordingly, each of the one or more processors 211 may be a controller, an integrated circuit, a microchip, a computer, or any other computing device. Each of the one or more processors 211 is communicatively coupled to the other components of the unmanned aerial vehicle 130 by the communication path 216.

Each of the one or more memory modules 212 of the unmanned aerial vehicle 130 is coupled to the communication path 216 and communicatively coupled to the one or more processors 211. Each of the one or more memory modules 212 may comprise RAM, ROM, flash memories, hard drives, or any device capable of storing machine readable instructions such that the machine readable instructions can be accessed and executed by the one or more processors 211. The one or more memory modules 212 may include information about a vehicle related to the order of an item. For example, information about the owner of the first vehicle 110 who ordered an item, and the information about the first vehicle 110 such as a vehicle model, color, and the like may be transmitted to and stored in the one or more memory modules 212.

Still referring to FIG. 2, the network interface hardware 213 is coupled to the communication path 216 and communicatively coupled to the one or more processors 211. The network interface hardware 213 may be any device capable of transmitting and/or receiving data via a network, similar to the network interface hardware 213. The network interface hardware 213 of the unmanned aerial vehicle 130 may communicate with the server 160, the first vehicle 110, or the second vehicle 120.

Still referring to FIG. 2, a satellite antenna 214 is coupled to the communication path 216 such that the communication path 216 communicatively couples the satellite antenna 214 to other modules of the unmanned aerial vehicle 130. The satellite antenna 214 is configured to receive signals from global positioning system satellites similar to the satellite antenna 204.

Still referring to FIG. 2, one or more cameras 215 are coupled to the communication path 216 such that the communication path 216 communicatively couples the one or more cameras 215 to other modules of the unmanned aerial vehicle 130. Each of the one or more cameras 215 may be any device having an array of sensing devices (e.g., pixels) capable of detecting radiation in an ultraviolet wavelength band, a visible light wavelength band, or an infrared wavelength band. Each of the one or more cameras 215 may have any resolution. The one or more cameras 215 may include an omni-directional camera, or a panoramic camera. In some embodiments, one or more optical components, such as a mirror, fish-eye lens, or any other type of lens may be optically coupled to at least one of the one or more cameras 215. The one or more cameras 215 may be used to capture an image of vehicles nearby, e.g., the first vehicle 110.

Still referring to FIG. 2, the communication path 216 may be formed from any medium that is capable of transmitting a signal such as, for example, conductive wires, conductive traces, optical waveguides, or the like, similarly to the communication path 207. Moreover, the communication path 216 may be formed from a combination of mediums capable of transmitting signals.

Now referring to the second vehicle 120, the second vehicle 120 includes one or more processors 221, one or more memory modules 222, a satellite antenna 223, a network interface hardware 224, and one or more vehicle sensors 225. The one or more processors 221 may be processors similar to the one or more processors 201 described above. The one or more memory modules 222 may be memories similar to the one or more memory modules 202 described above. The satellite antenna 223 may be a satellite antenna similar to the satellite antenna 204 described above. The network interface hardware 224 may be an interface hardware similar to the network interface hardware 203 described above. The one or more vehicle sensors 225 may be vehicle sensors similar to the one or more vehicle sensors 205 described above. The communication path 226 may be a communication path similar to the communication path 207 described above.

The one or more memory modules 222 of the second vehicle 120 include a path planner module 272, and an entity manager module 274. Each of the path planner module 272, and the entity manager module 274 may be a program module in the form of operating systems, application program modules, and other program modules stored in one or more memory modules 222. In some embodiments, the program module may be stored in a remote storage device that may communicate with the server 160. Such a program module may include, but is not limited to, routines, subroutines, programs, objects, components, data structures, and the like for performing specific tasks or executing specific data types as will be described below.

The path planner module 272 is configured to monitor mobility information of entities such as the first vehicle 110 and the second vehicle 120 and maintain the destination and route information of the entities. The path planner module 272 is also configured to inform the entity manager module 274 about instructions received from the server 160. The path planner module 272 verifies the instructions received from the server 160 based on the origin and destination of the first vehicle 110 or the second vehicle 120.

The entity manager module 274 is configured to perform coordination with the unmanned aerial vehicle 130 and the server 160. The entity manager module 274 may inform the server 160 about mobility or route information and state of delivery. The entity manager module 274 may coordinate communication with one or more item delivery unmanned aerial vehicles. The entity manager module 274 is configured to open or close the container of the second vehicle 120. For example, the entity manager module 274 opens or closes the trunk or sunroof of the second vehicle 120 or a delivery pod.

Now referring to the server 160, the server 160 includes one or more processors 241, one or more memory modules 245, a network interface hardware 242, and a communication path 243. The one or more processors 241 may be processors similar to the one or more processors 201 described above. The one or more memory modules 245 may be memories similar to the one or more memory modules 202 described above. The network interface hardware 242 may be an interface hardware similar to the network interface hardware 203 described above. The communication path 243 may be a communication path similar to the communication path 207 described above. The one or more processors 241 in combination of one or more memory modules 245 may operate as an electronic control unit for the server 160.

The one or more memory modules 245 of the server 160 includes a delivery manager module 250 and an entity manager module 260. The delivery manager module 250 includes a delivery oracle module 252 and a delivery planner module 254. The entity manager module 260 includes an entity route planner module 262 and an entity information manager module 264. Each of the delivery manager module 250, the delivery oracle module 252, the delivery planner module 254, the entity manager module 260, the entity route planner module 262, and the entity information manager module 264 may be a program module in the form of operating systems, application program modules, and other program modules stored in one or more memory modules 245. In some embodiments, the program module may be stored in a remote storage device that may communicate with the server 160. Such a program module may include, but is not limited to, routines, subroutines, programs, objects, components, data structures, and the like for performing specific tasks or executing specific data types as will be described below.

The delivery oracle module 252 is configured to determine a meeting time and a zone for the first vehicle 110 and the second vehicle 120. The delivery oracle module 252 may receive mobility information of the first vehicle 110 and the second vehicle 120, and compute a time and a zone for a delivery of the item 132 based on actual and/or predicted traffic and road conditions. The delivery oracle module 252 may inform the delivery planner module 254 and the entity route planner module 262 about the time and the zone for the delivery.

The delivery planner module 254 is configured to plan the delivery of the item. The delivery planner module 254 may optimize on-road item delivery. For example, based on potential meeting time and location pairs received from the delivery oracle module 252, the delivery planner module 254 may maximize the delivery by the unmanned aerial vehicle 130 and minimize travelling time of the first vehicle 110 and the second vehicle 120.

The entity route planner module 262 is configured to plan the route of the first vehicle 110 based on various factors including, but not limited to, available or predicted traffic information, minimum travelling time, preferences of a driver, and the like. The route may include the zone 140 such that the first vehicle 110 may stop or move less than a threshold value at the zone 140 and receive the item 132 from the second vehicle 120. The entity route planner module 262 is also configured to plan the route of the second vehicle 120 based on the various factors. The route of the second vehicle 120 may also include the zone 140 such that the first vehicle 110 and the second vehicle arrive at the zone 140 at the same time and perform the delivery of the item 132 by, e.g., the unmanned aerial vehicle 130.

The entity information manager module 264 is configured to receive information about entities such as the first vehicle 110 and the second vehicle 120 and the state of item delivery. The information about entities may include, but is not limited to, mobility of the entities, handshaking credential for secure item delivery, and the like. The state of item delivery may include a state where the unmanned aerial vehicle 130 is on the way to a meeting location, e.g., the zone 140, a state where the unmanned aerial vehicle 130 opens the second vehicle and delivers the item 132 to the first vehicle 110, and a state where the unmanned aerial vehicle 130 completed the delivery of the item to the first vehicle 110. The entity information manager module 264 may inform the delivery oracle module 252 and the delivery planner module 254 about mobility information of entities and state of package delivery.

FIG. 3 is a flowchart for delivering an item to a moving vehicle, according to one or more embodiments shown and described herein.

Figure 7:
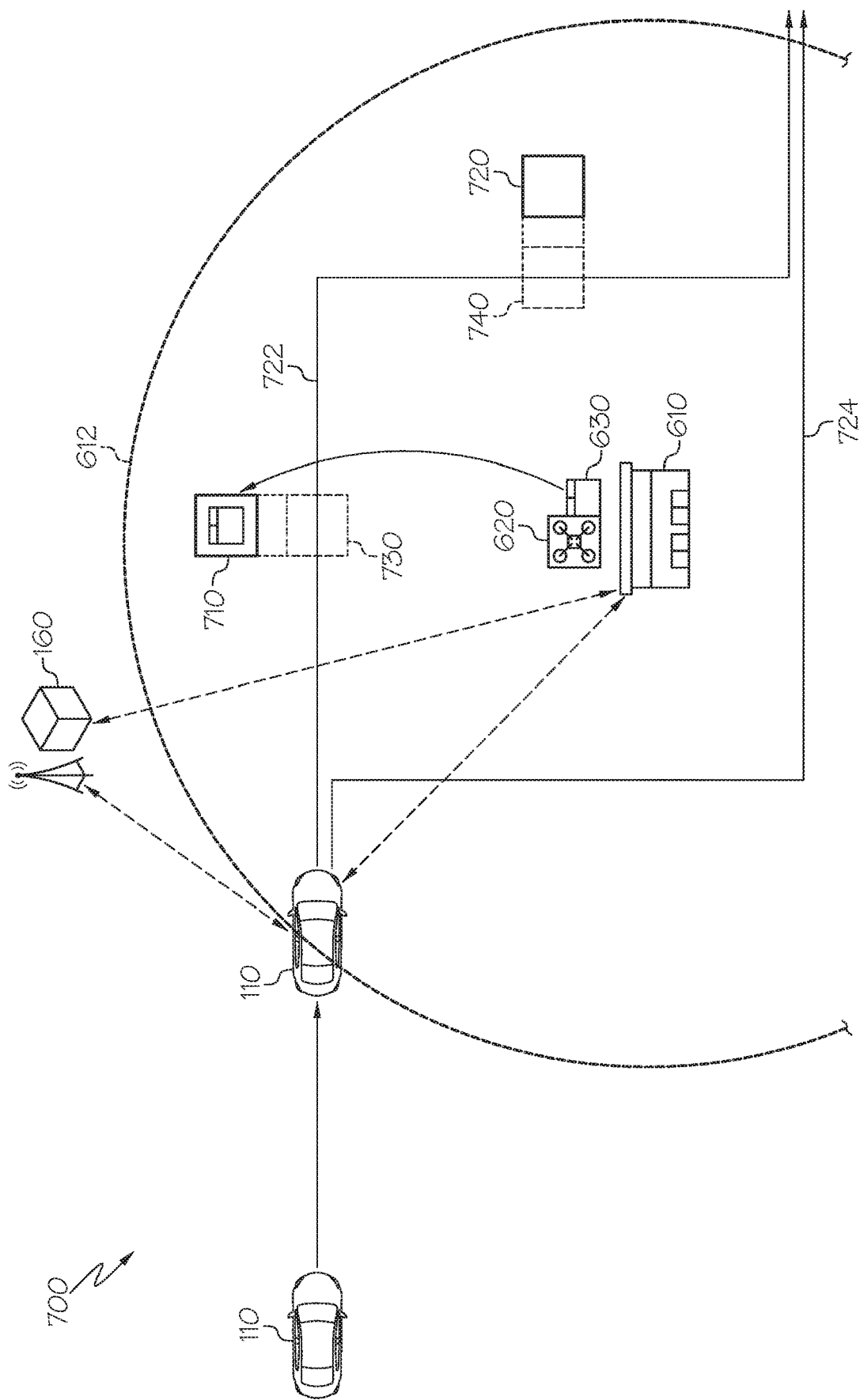
FIG. 7 depicts a system for delivering an item to a moving vehicle, according to another embodiment shown and described herein.

In block 310, the server 160 determines a location or a traveling schedule of the first vehicle 110 and a location of a second device (e.g., the second vehicle 120 or the stationary container 710 in FIG. 7). The first vehicle 110 may transmit the location and the traveling schedule to the server 160 and the second vehicle 120 may transmit its location to the server 160.

In block 320, the server 160 determines a zone where the first vehicle 110 and the second device are expected to be proximate each other based on traffic information, the location or the traveling schedule of the first vehicle, and the location of the second vehicle 120. For example, by referring to FIG. 1, the server 160 may determine that the first vehicle 110 and the second vehicle 120 are expected to be proximate each other at the zone 140 based on location L1 of the first vehicle 110, location L2 of the second vehicle 120, and traffic information including traffic flow information and information about the traffic light 142.

In block 330, the server 160 instructs the first vehicle 110 to move to the zone 140. For example, the server 160 may transmit a routing instruction to the first vehicle 110 including the information about the zone 140.

In block 340, the server 160 instructs the second device to transfer an item to the first vehicle in response to determining that the first vehicle 110 and the second device are proximate each other at the zone. In embodiments, when the first vehicle 110 and the second vehicle 120 arrive at the zone 140, the server 160 may instruct the second vehicle 120 to transfer the item 132 to the first vehicle 110. The second vehicle 120 may open its trunk or sunroof and the unmanned aerial vehicle 130 may transfer the item 132 from the second vehicle 120 to the first vehicle 110 by flying a relatively short distance. In embodiments, the server 160 may determine that the first vehicle 110 and the second vehicle 120 are proximate each other by receiving messages from the first vehicle 110 and the second vehicle 120 indicating respective positions of the first vehicle 110 and the second vehicle 120, and determining that the positions are within a threshold distance from one another and are in the zone. In embodiments, the server 160 may determine that the first vehicle 110 and the second vehicle 120 are proximate each other by receiving messages from the first vehicle 110 and the second vehicle 120 indicating respective positions of the first vehicle 110 and the second vehicle 120, and determining that the positions are within the zone. In embodiments, the server 160 may determine that the first vehicle 110 and the second vehicle 120 are proximate each other by receiving messages from the first vehicle 110 and the second vehicle 120 indicating respective positions of the first vehicle 110 and the second vehicle 120, and determining that the positions are within a threshold distance of the zone.

In some embodiments, the server 160 may determine whether the first vehicle 110 and the second vehicle 120 stop at the zone 140 or move less than a threshold speed based on mobility data received from the first vehicle 110 and the second vehicle 120. If it is determined that the first vehicle 110 and the second vehicle 120 stop at the zone 140 or move slower than a threshold speed, the server 160 may instruct the second vehicle 120 to transfer the item 132 to the first vehicle 110. If it is determined that the first vehicle 110 and the second vehicle 120 do not stop at the zone 140 or move faster than a threshold speed, the server 160 may instruct the second vehicle 120 to defer the delivery of the item 132.

In block 350, the server 160 may determine whether the item is transferred to the first vehicle 110 at the zone. In embodiments, the second vehicle 120 may transmit the status of the delivery of the item to the server 160. If the status indicates that the item 132 is transferred to the first vehicle 110, the server 160 may update the status of the delivery as completed.

Figure 4:
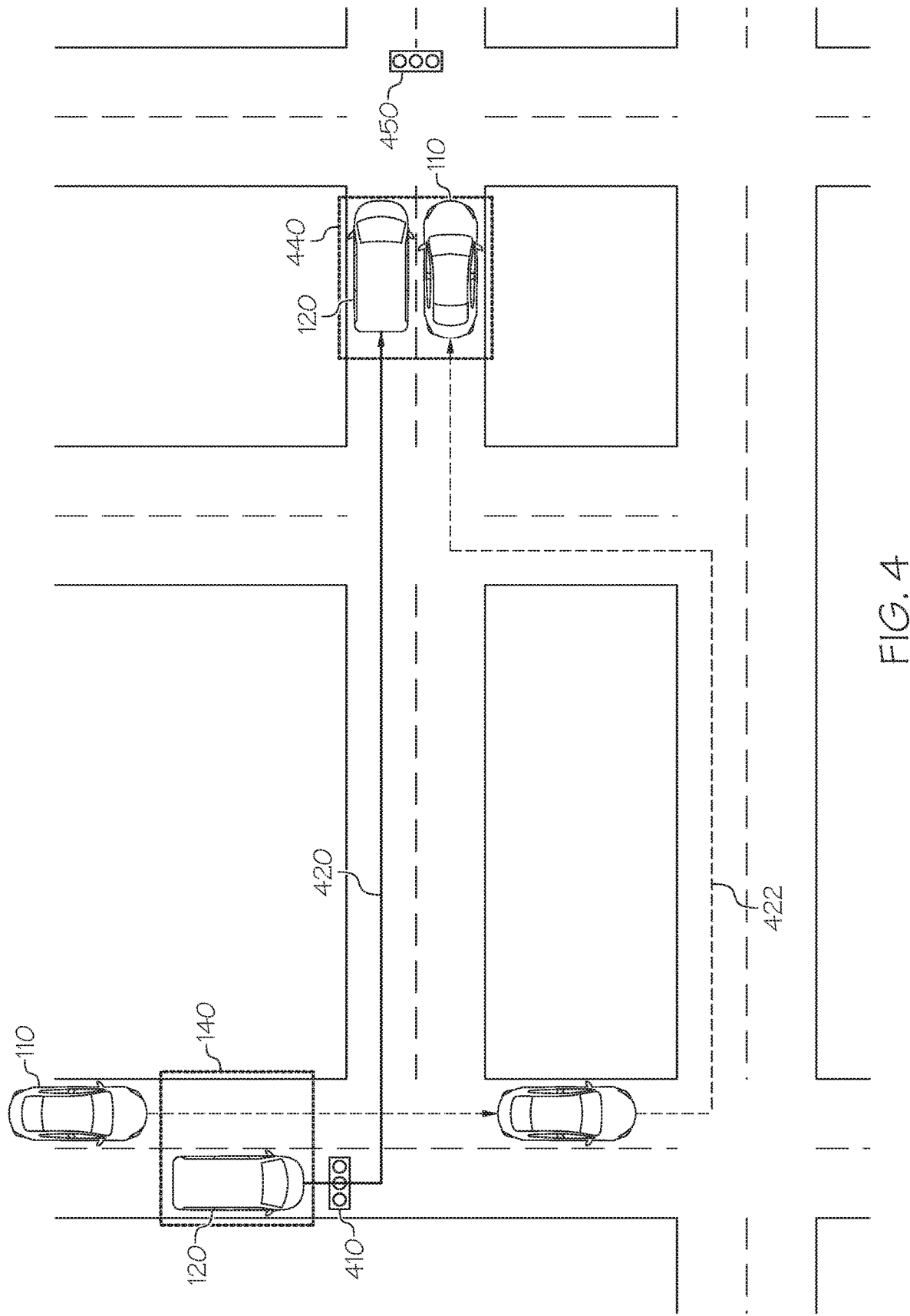
FIG. 4 depicts an exemplary scenario where a first vehicle and a second vehicle meet at another zone after failing to deliver an item at an original zone, according to one or more embodiments shown and described herein.

If the status indicates that the item 132 has not been transferred to the first vehicle 110 after the first vehicle 110 departs the zone 140 (NO at block 350), the server 160 may determine another zone where the first vehicle 110 and the second vehicle 120 are expected to be proximate each other based on traffic information, the location or the traveling schedule of the first vehicle 110, and the location of the second vehicle 120 at block 360. By referring to FIG. 4, the first vehicle 110 and the second vehicle 120 are expected to be proximate each other at the zone 140 and stop at the zone 140. However, due to the change of a traffic light, e.g., from red to green, the first vehicle 110 may pass the zone 140 without stopping at the zone 140. In this example, the second vehicle 120 may not be able to deliver the item 132 using the unmanned aerial vehicle 130 flying a short distance. Then, the server 160 may determine another zone 440 where the first vehicle 110 and the second vehicle 120 are expected to be proximate each other based on traffic information, the location or the traveling schedule of the first vehicle 110, and the location of the second vehicle 120.

Referring back to FIG. 3, in block 370, the server 160 instructs the first vehicle 110 to move to another zone. For example, referring to FIG. 4, the server 160 may transmit a routing instruction to the first vehicle 110 to follow a route 422 that leads to the zone 440. The server 160 may also transmit a routing instruction to the second vehicle 120 to follow a route 420 that leads to the zone 440.

Referring back to FIG. 3, in block 380, the server 160 instructs the second vehicle 120 to transfer the item to the first vehicle 110 in response to determining that the first vehicle 110 and the second device are proximate each other at the zone 440.

If the status indicates that the item 132 has been transferred to the first vehicle 110 after the first vehicle 110 departs the zone 140 (YES at block 350), the server 160 may determine that delivery has been completed at block 390.

Figure 5:
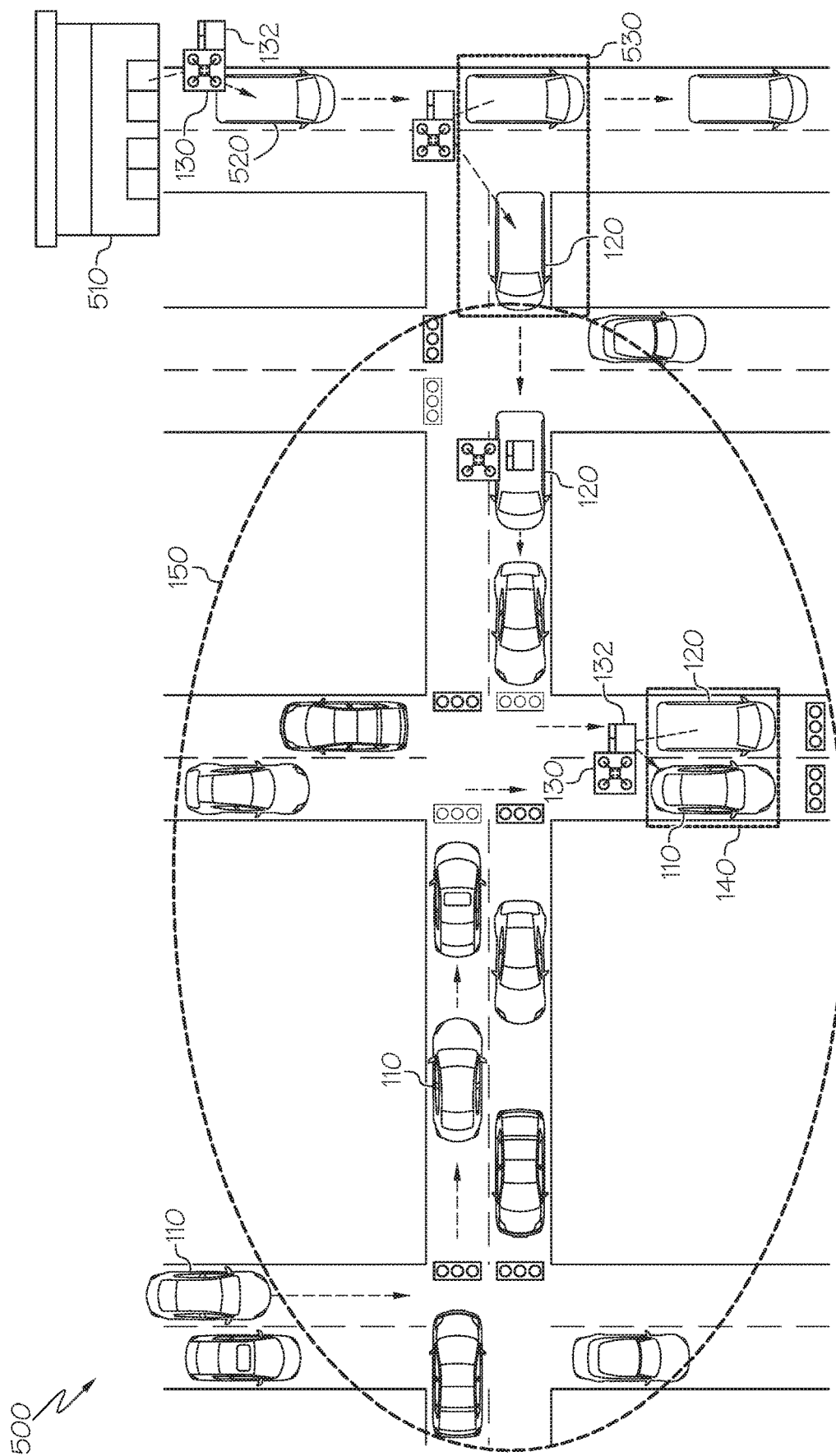
FIG. 5 depicts a system for delivering an item to a moving vehicle, according to another embodiment shown and described herein.

FIG. 5 depicts a system for delivering an item to a moving vehicle, according to another embodiment shown and described herein. In embodiments, the system 500 includes the first vehicle 110, the second vehicle 120, a third vehicle 520, a store 510 and a server 160. The third vehicle 520 may be a vehicle similar to the second vehicle 120. In FIG. 5, the ordered item 132 is not available in delivery vehicles within or proximate to the pick-up region 150. The store 510 storing the item 132 may transfer the item 132 to the third vehicle 520 using the unmanned aerial vehicle 130. The third vehicle 520 drives to a zone 530 where the third vehicle 520 and the second vehicle 120 are proximate each other. Then, the unmanned aerial vehicle 130 may transfer the item 132 from the third vehicle 520 to the second vehicle 120 in a similar way as the unmanned aerial vehicle 130 transfers the item from the second vehicle 120 to the first vehicle 110 as discussed above with reference to FIG. 1B. After the transfer of the item from the third vehicle 520 to the second vehicle 120, the unmanned aerial vehicle 130 may be carried in the second vehicle 120 or follow the second vehicle 120. Then, the first vehicle 110 and the second vehicle 120 meet at the zone 140 and the unmanned aerial vehicle 130 transfers the item 132 from the second vehicle 120 to the first vehicle 110.

Figure 6:
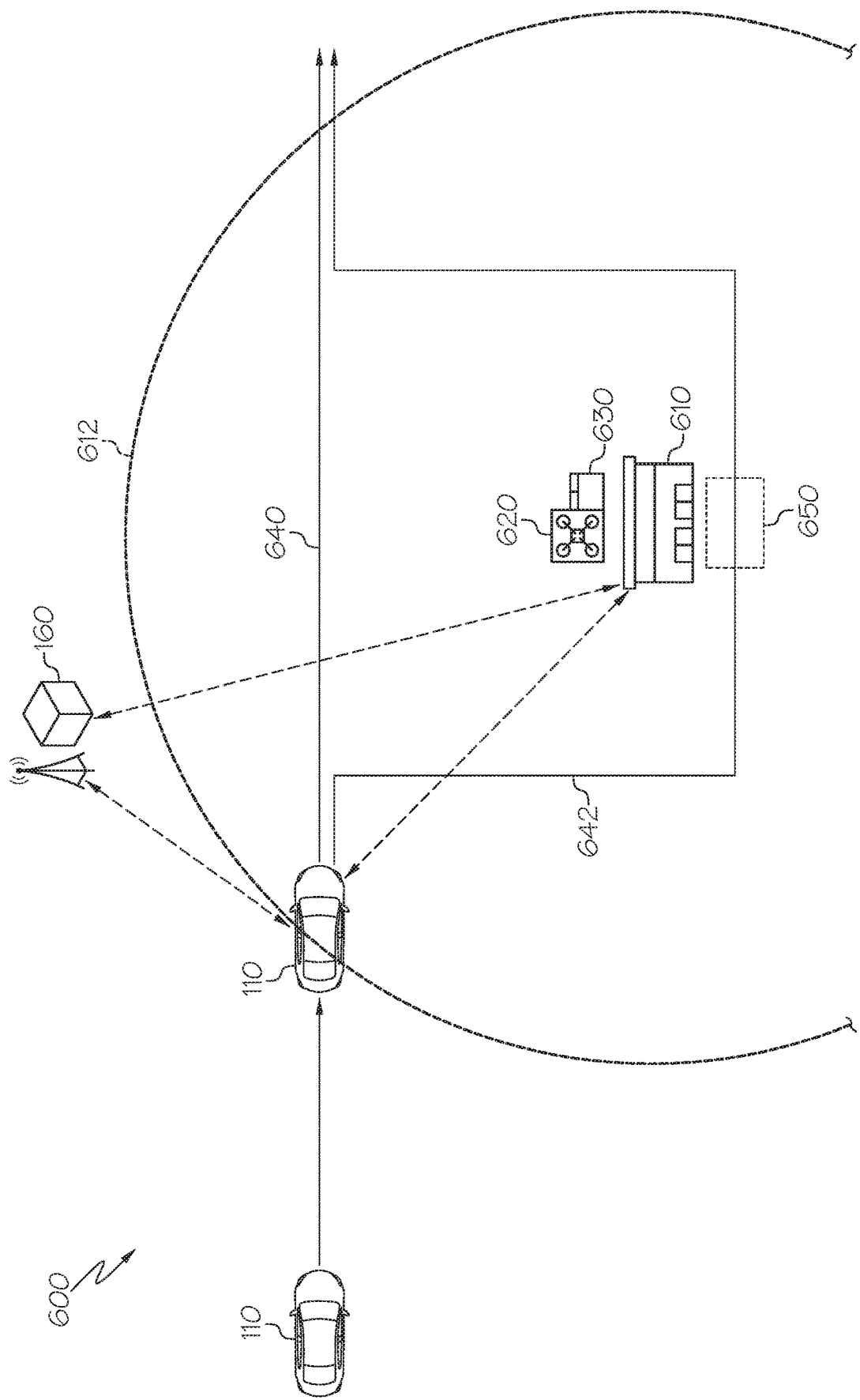
FIG. 6 depicts a system for delivering an item to a moving vehicle, according to another embodiment shown and described herein.

FIG. 6 depicts a system for delivering an item to a moving vehicle, according to another embodiment shown and described herein. In embodiment, the system 600 includes a first vehicle 110, a server 160, a store 610, and an unmanned aerial vehicle 620.

The first vehicle 110 may transmit the location and route of the first vehicle 110 to the server 160. For example, the first vehicle 110 may transmit a route 640 as its intended route to the server 160. The store 610 includes a geo-fence area 612. In embodiments, once the first vehicle 110 comes within the geo-fence area 612, the store 610 (e.g., by way of a server associated with the store 610) may take control over the first vehicle 110 and operate the first vehicle 110 to follow the route 642. In some embodiments, once the first vehicle 110 comes within the geo-fence area 612, the server 160 may transmit a routing instruction to the first vehicle 110 to follow the route 642 instead of the route 640.

When the first vehicle 110 arrives at a zone 650, the store 610 may dispatch the unmanned aerial vehicle 620 to transfer the item 630 to the first vehicle 110. In this example, the unmanned aerial vehicle 620 only needs to fly a relatively short distance. Once the delivery is completed, the unmanned aerial vehicle 620 may return and stay at the store 610. In some embodiments, right before the first vehicle arrives at a zone 650, the store 610 (e.g., by way of a server associated with the store 610) may dispatch the unmanned aerial vehicle 620 such that the unmanned aerial vehicle 620 and the vehicle 110 meet at the zone 650 at the same time.

FIG. 7 depicts a system for delivering an item to a moving vehicle, according to another embodiment shown and described herein. In embodiment, the system 700 includes a first vehicle 110, a server 160, a store 610, an unmanned aerial vehicle 620, and a stationary container 710.

The first vehicle 110 may transmit the location and route of the first vehicle 110 to the server 160. For example, the first vehicle 110 may transmit a route 724 as its intended route to the server 160. The store 610 includes a geo-fence area 612. In embodiments, once the first vehicle 110 comes within the geo-fence area 612, the store 610 may take control over the first vehicle 110 and operate the vehicle 110 to follow the route 722. In some embodiments, once the first vehicle 110 comes within the geo-fence area 612, the server 160 may transmit a routing instruction to the first vehicle 110 to follow the route 722 instead of the route 724.

When the first vehicle 110 arrives at a zone 730, the stationary container 710 containing the item 630 may open its container such that the first vehicle 110 may pick up the item 630. In embodiments, the unmanned aerial vehicle 620 may deliver the item 630 from the store 610 to the stationary container 710 in advance of the first vehicle arriving the zone 730. For example, when the item 110 is ordered by the driver or passenger of the first vehicle 110, the unmanned aerial vehicle 620 may transfer the item 630 form the store 610 to the stationary container 710. As another example, when it is determined that the first vehicle 110 enters the geo-fence area 612, the unmanned aerial vehicle 620 may transfer the item 630 form the store 610 to the stationary container 710.

The system 700 may include additional stationary containers, e.g., a stationary container 720. If the first vehicle 110 fails to receive the item 630 at the zone 730, the first vehicle 110 may be provided another opportunity to receive the item from the stationary container 720 at a zone 740. In this example, the unmanned aerial vehicle 620 may transfer the same item to both the stationary containers 710 and 720. In another example, the unmanned aerial vehicle 620 may transfer the item in the stationary container 710 to the stationary container 720.

It should be understood that embodiments described herein are directed to methods and systems for delivering an item. The method includes determining a location or a traveling schedule of a first vehicle and a location of a second device, determining a zone where the first vehicle and the second device are expected to be proximate each other based on traffic information, the location or the traveling schedule of the first vehicle, and the location of the second device, instructing the first vehicle to move to the zone, and instructing the second device to transfer an item to the first vehicle in response to determining that the first vehicle and the second device are proximate each other at the zone.

According to the present disclosure, an item is delivered to a trusted entity (e.g., a vehicle) while the entity is on-road. A system of the present disclosure seeks to accommodate customer preferences and aims to conveniently deliver items based on a customer's schedule. The system first tries to perform on-road drone package delivery near a store. If this logistics is not possible and/or creates an unwanted congestion, then the system instructs two entities (e.g., a drone-hosted delivery entity and customer selected trusted entity) to reroute such that they meet with each other and stay stationary enough based on dynamic, static and/or predetermined metrics such as available/predicted traffic information and/or road conditions for on-road drone package delivery. When the entities meet with each other, an unmanned aerial vehicle delivers the item from a delivery entity to a customer entity. The system may utilize short-range communication to verify and authenticate between the delivery and customer entities.

The systems and methods according to the present disclosure provide the secure, convenient, and customized delivery of an item to a trusted entity. Specifically, the system of the present disclosure helps a customer to order an item online and pick up the item at a preferred time while commuting on road. Whenever a customer orders an item, the customer may select a delivery location, a range and an estimated pick-up time based on her schedule, e.g., commuting schedule. Based on customer preferences, the estimated location range and pick-up time are elected, and the system organizes delivering an item based on the estimated location range and pick-up time according to the customer's schedule and/or plan. Additionally, according to the present disclosure, an unmanned aerial vehicle operates to fly for a short time and/or distance and to fly within the line of sight view of a human operator.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
 a controller programmed to:
  determine at least one of a location and a traveling schedule of a first vehicle and a location of a second device, wherein the second device is a vehicle;
  determine a zone where the first vehicle and the second device are expected to be proximate each other based on traffic information, at least one of the location and the traveling schedule of the first vehicle, and the location of the second device;
  instruct the first vehicle to move to the zone;
  determine whether the first vehicle and the second device move less than a threshold speed based on mobility data received from the first vehicle and the second device;
  instruct an unmanned aerial vehicle to transfer an item from the second device to the first vehicle in response to determining that the first vehicle and the second device are proximate each other at the zone and the first vehicle and the second device move slower than the threshold speed;
  instruct the unmanned aerial vehicle to defer to transfer the item from the second device to the first vehicle in response to determining that the first vehicle and the second device move faster than the threshold speed;
  receive a route of the first vehicle;
  determine whether the first vehicle is within a geo-fence of a store;
  control movement of the first vehicle in response to determination that the first vehicle is within the geo-fence of the store; and
  operate the first vehicle to follow the route of the first vehicle.

2. The system of claim 1, wherein:
 the second device includes the item, and
 the controller is further programmed to:
  instruct the second device to move to the zone.

3. The system of claim 1, wherein:
 the controller is further programmed to:
  obtain a trajectory of the first vehicle; and
  instruct a store to deliver the item to the second device before the first vehicle arrives at the zone based on the trajectory.

4. The system of claim 1, wherein:
 the controller is further programmed to:
  authenticate the first vehicle in response to determining that the first vehicle and the second device are proximate each other at the zone.

5. The system of claim 1, wherein the traffic information includes at least one of a traffic condition, a chronic congested area, and traffic light information at intersections.

6. The system of claim 1, wherein the controller is further programmed to:
 determine the zone where the first vehicle and the second device are expected to be proximate each other based on one or more locations where the first vehicle is expected to stop or move less than a predetermined speed.

7. The system of claim 1, wherein the zone includes at least one of a parking lot, a rest area, an intersection, a short-term pull over area, and a low speed limit zone.

8. The system of claim 1, wherein the controller is further programmed to:
 determine the zone where the first vehicle and the second device are expected to move less than a threshold speed or stop for a predetermined time based on traffic information.

9. The system of claim 1, wherein the controller is further programmed to:
 instruct the second device to open a trunk or a sunroof of the second device in response to determining that the first vehicle and the second device are proximate each other at the zone.

10. The system of claim 1, wherein the controller is further programmed to:
 receive a route of the first vehicle;
 determine whether the route of the first vehicle overlaps with the zone;
 update the route of the first vehicle such that the route overlaps with the zone in response to determination that the route of the first vehicle does not overlap with the zone; and
 instruct the first vehicle to follow the updated route.

11. The system of claim 1, wherein the controller is further programmed to:
 determine whether the item is in the second device after the first vehicle departs from the zone; and
 instruct the first vehicle to move to a predetermined location in response to determination that the item is in the second device after the first vehicle departs from the zone.

12. The system of claim 1, wherein the controller is further programmed to:

determine whether the item is in the second device after the first vehicle departs from the zone;

determine another zone where the first vehicle and the second device are expected to be proximate each other based on traffic information, the location or the traveling schedule of the first vehicle, and the location of the second device;

instruct the first vehicle to move to the another zone in response to determination that the item is in the second device after the first vehicle departs from the zone; and instruct the second device to transfer the item to the first vehicle in response to determining that the first vehicle and the second device are proximate each other at the another zone.

13. The system of claim 1, wherein the controller is further programmed to:

receive an order for the item from a terminal of a user; and obtain a commute path or a trajectory of the first vehicle, wherein the first vehicle is a vehicle authorized by the user.

14. The system of claim 1, wherein the controller is further programmed to:

obtain a commute path or a trajectory of the first vehicle;

obtain a trajectory or a location of the second device; and determine the zone where the first vehicle and the second device are expected to be proximate each other further based on the commute path or the trajectory of the first vehicle and the trajectory or the location of the second device.

15. The system of claim 1, wherein the controller is further programmed to:

instruct the unmanned aerial vehicle to transfer the item from a store to a third vehicle;

instruct the third vehicle to drive to a zone where the third vehicle and the second device are proximate each other;

instruct the unmanned aerial vehicle to transfer the item from the third vehicle to the second device;

instruct the unmanned aerial vehicle to be carried in the second device or follow the second device; and instruct the unmanned aerial vehicle to transfer the item from the second device to the first vehicle at a zone where the first vehicle and the second device are proximate each other.

16. A method for delivering an item, the method comprising:

determining, by a controller, at least one of a location and a traveling schedule of a first vehicle and a location of a second device, wherein the second device is a vehicle;

determining, by the controller, a zone where the first vehicle and the second device are expected to be proximate each other based on traffic information, at least one of the location and the traveling schedule of the first vehicle, and the location of the second device;

instructing, by the controller, the first vehicle to move to the zone;

determining, by the controller, whether the first vehicle and the second device move less than a threshold speed based on mobility data received from the first vehicle and the second device;

instructing, by the controller, an unmanned aerial vehicle to transfer an item from the second device to the first vehicle in response to determining that the first vehicle and the second device are proximate each other at the zone and the first vehicle and the second device move slower than the threshold speed;

instructing, by the controller, the unmanned aerial vehicle to defer to transfer the item from the second device to the first vehicle in response to determining that the first vehicle and the second device move faster than the threshold speed;

receiving, by the controller, a route of the first vehicle;

determining, by the controller, whether the first vehicle is within a geo-fence of a store;

controlling, by the controller, movement of the first vehicle in response to determination that the first vehicle is within the geo-fence of the store; and operating, by the controller, the first vehicle to follow the route of the first vehicle.

17. The method of claim 16, further comprising:

receiving, by the controller, a route of the first vehicle;

determining, by the controller, whether the route of the first vehicle overlaps with the zone;

updating, by the controller, the route of the first vehicle such that the route overlaps with the zone in response to determination that the route of the first vehicle does not overlap with the zone; and instructing, by the controller, the first vehicle to follow the updated route.

18. A system comprising:

a first vehicle;

a second device, wherein the second device is a vehicle; and a server communicatively coupled to the first vehicle and the second device and configured to:

determine a zone where the first vehicle and the second device are expected to be proximate each other based on traffic information, at least one of a location and a traveling schedule of the first vehicle, and a location of the second device;

instruct the first vehicle to move to the zone;

determine whether the first vehicle and the second device move less than a threshold speed based on mobility data received from the first vehicle and the second device;

instruct an unmanned aerial vehicle to transfer an item from the second device to the first vehicle in response to determining that the first vehicle and the second device are proximate each other at the zone and the first vehicle and the second device move slower than the threshold speed;

instruct the unmanned aerial vehicle to defer to transfer the item from the second device to the first vehicle in response to determining that the first vehicle and the second device move faster than the threshold speed;

receive a route of the first vehicle;

determine whether the first vehicle is within a geo-fence of a store;

control movement of the first vehicle in response to determination that the first vehicle is within the geo-fence of the store; and operate the first vehicle to follow the route of the first vehicle.

* * * * *

UNITED STATES PATENT AND TRADEMARK OFFICE
CERTIFICATE OF CORRECTION

| | | |
|---|---|---|
| PATENT NO. | : 12,045,761 B2 | Page 1 of 1 |
| APPLICATION NO. | : 16/580339 | |
| DATED | : July 23, 2024 | |
| INVENTOR(S) | : Seyhan Uçar, Baik Hoh and Kentaro Oguchi | |

It is certified that error appears in the above-identified patent and that said Letters Patent is hereby corrected as shown below:

In the Specification

In Column 5, Line(s) 8, before "the like", delete "at" and insert --or--, therefor.

Signed and Sealed this
First Day of October, 2024

Katherine Kelly Vidal
*Director of the United States Patent and Trademark Office*